(12) United States Patent
Heisz

(10) Patent No.: US 11,061,965 B1
(45) Date of Patent: Jul. 13, 2021

(54) STORED PROCEDURE EXECUTION IN A DISTRIBUTED DATABASE SYSTEM

(71) Applicant: Teradata US, Inc, Dayton, OH (US)

(72) Inventor: Jeffrey M. Heisz, Toronto (CA)

(73) Assignee: Teradata US, Inc., San Diego, CA (US)

( * ) Notice: Subject to any disclaimer, the term of this patent is extended or adjusted under 35 U.S.C. 154(b) by 992 days.

(21) Appl. No.: 14/211,312

(22) Filed: Mar. 14, 2014

Related U.S. Application Data

(60) Provisional application No. 61/798,430, filed on Mar. 15, 2013.

(51) Int. Cl.
*G06F 16/90* (2019.01)

(52) U.S. Cl.
CPC .................................. *G06F 16/90* (2019.01)

(58) Field of Classification Search
CPC ......... G06F 17/30348; G06F 17/30477; G06F 8/45; G06F 8/423; G06F 8/451; G06F 8/457; Y10S 707/966
USPC ................................ 707/702, 704–705, 781
See application file for complete search history.

(56) References Cited

U.S. PATENT DOCUMENTS

| | | | | |
|---|---|---|---|---|
| 5,754,845 A * | 5/1998 | White | ........................ | G06F 8/38 707/702 |
| 5,832,484 A * | 11/1998 | Sankaran | .......... | G06F 17/30362 |
| 5,978,577 A * | 11/1999 | Rierden | ............ | G06F 17/30575 |
| 6,292,822 B1 * | 9/2001 | Hardwick | ............... | G06F 8/451 718/102 |
| 6,401,079 B1 * | 6/2002 | Kahn | .................... | G06Q 20/102 705/30 |
| 6,523,036 B1 * | 2/2003 | Hickman | .......... | G06F 17/30575 707/704 |
| 7,305,354 B2 * | 12/2007 | Rodriguez | ............. | G06Q 30/06 348/E7.071 |
| 7,634,477 B2 * | 12/2009 | Hinshaw | ............... | G06F 16/273 |
| 8,332,376 B2 * | 12/2012 | Martinez | ........... | G06F 17/30336 707/705 |
| 8,489,567 B2 * | 7/2013 | Barabas | ............ | G06F 17/30362 707/704 |
| 8,849,749 B2 * | 9/2014 | Rishel | .................... | G06F 9/5083 707/609 |
| 2007/0203910 A1 * | 8/2007 | Ferguson | .......... | G06F 17/30575 |
| 2010/0241595 A1 * | 9/2010 | Felsher | .................. | G06Q 10/10 705/400 |
| 2013/0339964 A1 * | 12/2013 | Cotner | .................. | G06F 9/4843 718/102 |

* cited by examiner

*Primary Examiner* — Alex Gofman
*Assistant Examiner* — Linh Black
(74) *Attorney, Agent, or Firm* — Randy L. Campbell, Jr.

(57) ABSTRACT

A method may include receiving a stored procedure associated with data stored in a plurality of data stores. The stored procedure may include a plurality of executable statements. The method may further include identifying a first executable statement of the plurality of executable statements to be executed by the processor and a second executable statement of the plurality of executable statements that is executable by at least one of a plurality of other processors. The other processors each may have access to only a respective one of the plurality of copies of the data. The method may further include executing the first executable statement. A system and computer-readable medium may also be implemented.

20 Claims, 3 Drawing Sheets

STORED PROCEDURE EXECUTION IN A DISTRIBUTED DATABASE SYSTEM

CLAIM OF PRIORITY

This application claims the benefit of priority under 35 U.S.C. 119(e) of U.S. Provisional Patent Application Ser. No. 61/798,430 filed on Mar. 15, 2013, which is herein incorporated by reference in its entirety.

BACKGROUND

1. Technical Field

The present disclosure relates generally to execution of stored procedures, and in particular, to execution of a stored procedure in a distributed database system.

2. Related Art

A replicated, shared-nothing database architecture may support constructs that exist "inside" individual database servers and perform operations outside of the "known" execution flow though a controlling server. These constructs would include simple relationship elements like views, triggers, etc. as well as complex elements like stored procedures. However, there are various challenges in supporting such constructs. For example, because each database server is completely independent, there is the possibility that the outcomes of executing the internal functionality of the construct may be different, possibly leading to inconsistent data that may not be correctable/identifiable. In particular, "lights out" failures within the construct execution can occur at different points that cannot be exactly determined. This may be complicated by the fact that these constructs may include transactional control elements that will interfere with the transaction management systems being used by the controlling server.

To ensure data consistency, the controlling server needs to manage external execution locking and sequencing to properly order data access queries to avoid data deadlock and incorrect overwrite instances. To do this, a controller server may maintain a data dictionary that provides advisements pertaining to data elements that may be accessed by these constructs that can potentially be incorrect. In addition, these constructs support decision logic and dynamically constructed queries that are dependent on data conditions, making it difficult to get a "proper" data dictionary and requiring locking scopes that are supersets of the actual locks required—for example, the construct may access data table A or data table B based on an input parameter but the dictionary and controlling server will need to lock A and B to ensure correctness, leading to performance and deadlocking issues.

There are situations where these constructs can access external elements (e.g. mail servers) accidentally generating multiple events for a single request (as the construct is executed on the multiple replicated nodes). In addition, there are forms of these constructs (binary stored procedures) that cannot be scanned/examined properly, requiring potentially error-prone manual entries into the data dictionary to describe the effects of the procedure. Of course, this assumes that the source of these binary procedures is even available for examination. The last issue relates to the proper maintenance of the data dictionary and the handling of dynamic definition/modification of the procedure elements. Creation of the procedure followed by a scan and deployment of the dictionary with many possibilities for errors and/or deployment timing conditions related to having the proper dictionary and the accessing of the associated procedure may occur.

SUMMARY

In one aspect of the present disclosure, a method may include receiving a stored procedure associated with data stored in a plurality of data stores. The stored procedure may include a plurality of executable statements. The method may further include identifying a first executable statement of the plurality of executable statements to be executed by the processor and a second executable statement of the plurality of executable statements that is executable by at least one of a plurality of other processors. The other processors each may have access to only a respective one of the plurality of copies of the data. The method may further include executing the first executable statement.

According to another aspect of the disclosure, a system may include a plurality of data store systems. Each data store system may include at least one respective processor and a respective storage device. Each storage device may include a copy of organized data. The system may further include a load balancer processor in communication with plurality of data store systems. The load balancer processor may receive a stored procedure associated with the organized data stored in each of the respective storage devices. The stored procedure may include a plurality of executable statements. The load balancer processor may further identify a first executable statement of the plurality of executable statements to be executed by the load balancer processor and a second executable statement of the plurality of executable statements that is executable by at least one the respective processors of the plurality of data store systems. The load balancer processor may further execute the first executable statement.

According to another aspect of the disclosure, a non-transitory computer-readable medium may be encoded with a plurality of instructions executable by a processor. The plurality of instructions may include instructions to receive a stored procedure associated with data stored in a plurality of data stores. The stored procedure may include a plurality of executable statements. The plurality of instructions may further include instructions to identify a first executable statement of the plurality of executable statements to be executed by the processor and a second executable statement of the plurality of executable statements that is executable by at least one of a plurality of other processors, wherein the other processors each have access to only a respective one of the plurality of copies of the data. The plurality of instructions may further include instructions to execute the first executable statement.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION OF THE DRAWINGS

Figure 1:
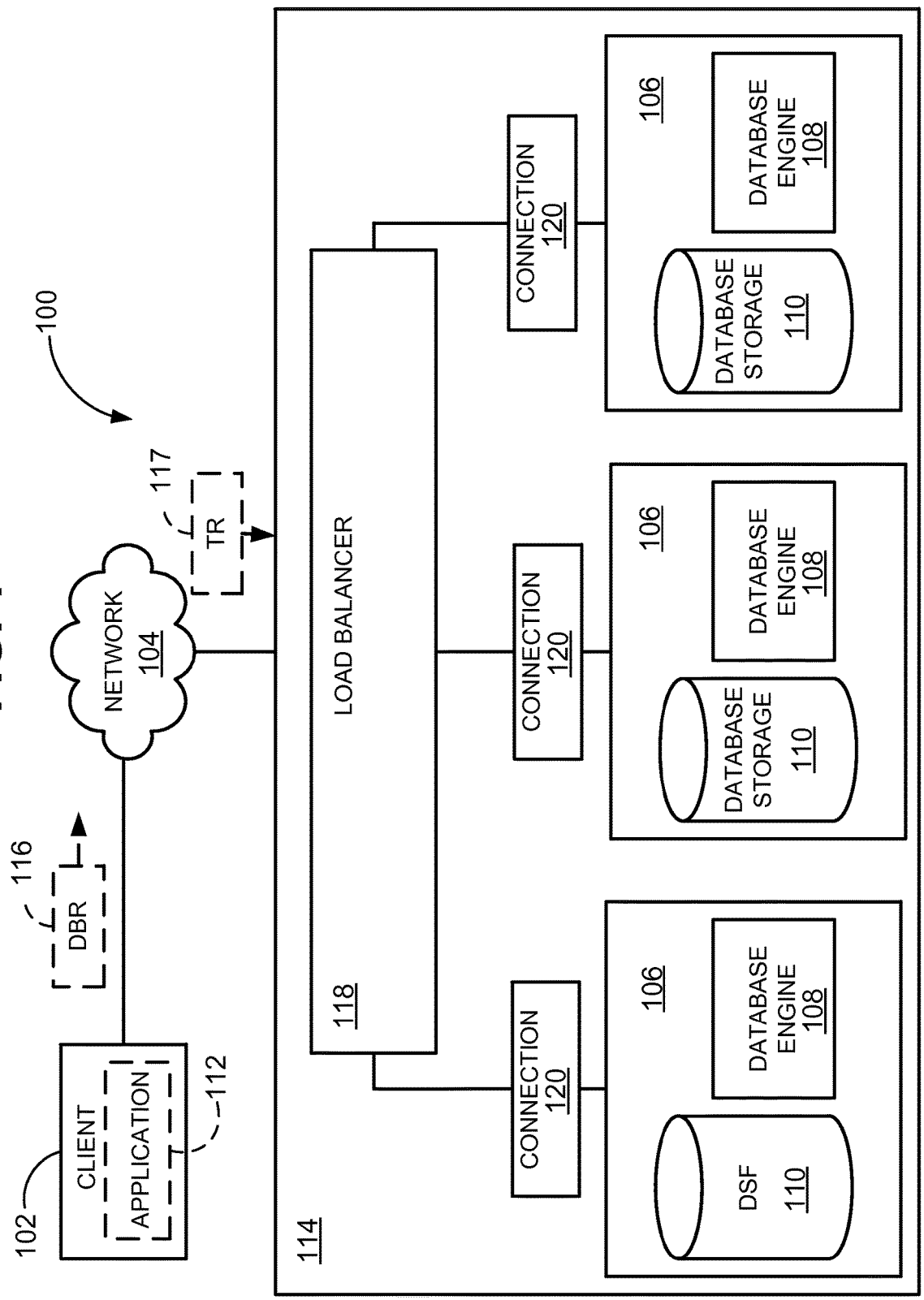
FIG. 1 is a block diagram of a system that includes a distributed database system.

Reference is now made to FIG. 1, where an example configuration of a system 100 used to access a database in a network environment is shown. FIG. 1 illustrates the interaction between clients 102, a network 104, and one or more a database servers 106. A server may include one or more physical processors and virtual processors. Various processing techniques may be implemented by the processors such as multiprocessing, multitasking, parallel processing and the like, for example. Each server may also include a persistent storage device, such as hard disk drive storage or flash drive storage. Each server may also include one or more memories and may be computer-readable storage media or memories, such as a cache, buffer, RAM, removable media, hard drive, flash drive or other computer-readable storage media. Computer-readable storage media may include various types of volatile and nonvolatile storage media. Thus, any task described as being executed by a server may refer to one or more processors executing the various tasks on the associated server.

Each database server 106 may include a database engine 108 and database storage facilities (DSF) 110. Each DSF 110 may represent one or more persistent storage devices, such as hard disk drive storage or flash drive storage. There are innumerable environments, systems, and architectural arrangements, where multiple clients/applications are dependent on the contents of a single DSF 110. In FIG. 1, a client 102 may represent one or more computing systems operating independently or in cooperation. Each computing system may include at least one processor, memory, persistent storage device, as well as input peripherals (e.g. keyboards, touch screen, mice, etc.) and output peripherals (e.g. monitors, printers, etc.).

The network 104 may be any network that allows for communication between devices such as a virtual private network, web-based, directly-connected, or some other suitable network configuration. The network 104 may also be wired, wireless, or some combination thereof. The client 102 may interact with the database servers 106 through one or more client applications 112 and make one or more requests relating to a database record via the network 104. The requests may include various database operations including, but not limited to, specific data read or write operations as well as operations associated with record metadata and transactional consistency (e.g. commit and rollback operations). The term database record is used to represent instances of data stored on the DSFs 110. For example, database records may exist in various formats, including but not limited to, a table format, an array format, a row format, a column format, or even as single instance data entries. Each database server 106 has stored upon it, or accessible to it, the database engine 108. The database engine 108 manages the storage of database records upon the DSFs 110. In one example, the database engine 108 may be a software application that controls access to the DSFs 110, which may be on the database server 106 or accessible to it. The database server 106 receives the requests, and proceeds to transmit the respective operations that make up the request to the database engine 108 for execution. The database server 106 is only able to serve a certain number of requests due to the inherent limitations faced by itself and the DSFs 110. The database limitations may include, but are not limited to, contention for simultaneous access to common database records, processing power, time of response, and storage capabilities (read/write rates). As a result, the database server 106 may at times be unable to serve the requesting server/application in as timely a manner as is required, and database bottlenecks develop as a result.

A distributed database system 114 may be used in different environments. The distributed database system 114 may be used by one software application that stores data, or in a network setting where there is client-server interaction, or any environment where data is stored. In the system 100, one or more clients 102 may initiate a database request (DBR) 116 from the application 112. The DBR 116 is generated based on the client's request for certain functionality or data. DBRs 116 result from most operations that are performed upon the client 102, including, but not limited to, the request to access certain data, saving a file, or to view certain files or data. The DBR 116 may be translated into one or more operations that access and or modify database records stored on the respective database servers 106. The DBR 116 is transmitted through the network 104, which may be translated by an application server (not shown) into one or more database-specific operations that are collectively referred to a transaction request (TR) 117. The transaction request 117 may contain database operations that are to be performed upon a database that is visible to the clients 102 in order to fulfill the DBR 116. To the clients 102 the various database engines 106 are not visible, but instead the one virtual database 114 is visible to the client 102. The transaction request 117 will result in one or more database operations, which may include, but are not limited to modifying option settings, read or select operations, write operations, commit operations, and rollback operations. The transaction request 117 may represent a set of database operations that are being processed as part of a single database transaction. In an exemplary embodiment, the distributed database 114 is implemented across one or more database servers 106, where as described, each database server 106 includes DSFs 110 that store the identical records that make up the database upon the respective DSFs 110. The example shown with respect to one distributed database 114 that is implemented through all of the database servers 106. In alternative embodiments, the database servers 106 may be used to implement more than one distributed database 114 that has multiple and different collections of data records. In examples where more than one database 114 is implemented upon the respective database servers 106, multiple database servers 106 may be used to replicate the data records for each database 114, however not all database servers 106 are required to implement all of the database instances. While the various database servers 106 may have stored upon them database data for more than one database, each copy of database data for each database may contain identical records, but, in some examples, one database may also include additional records, such as additional historical table data, as compared to other database copies. In such examples, the finest granularity may exist at a row/record level instead of at table level. An alternative example allows for the potential improved use of resources, as each database system is implemented upon the database servers 106 that are appropriate considering the processing requirements that are required.

A load balancer 118 receives the transaction request 117. The load balancer 118, in one example, may be resident upon an independent server that receives of the transaction request 117. In alternative embodiments, the load balancer 118 may be resident upon any one of the database servers 106 that it connects to, or other capable component of the system 100. In addition, more than one load balancer 118 may be present, where each load balancer 118 has associated with it one or more database engines and storage servers. In such an arrangement, there would also be connections between the load balancers for the coordination of the system. When more than one load balancer is used, one load balancer is designated as a master load balancer. As the load balancers must agree to the sequence of execution of the operations, as described below, the master load balancer would communicate the sequencing information with the other load balancers. Each load balancer also would maintain, in one example, transactional logs. The load balancer 118 is used to virtualize the plurality of database servers 106 into one distributed database 114. The distributed database 114 contains one or more database servers 106, but appears to be one database environment to the applications/servers that are sending transaction requests 117 to the load balancer 118. In the example embodiment, the load balancer 118 will equally balance read-based DBRs 116 across all of the database servers 106, depending on the availability of the database server 106 and its associated "busy-ness". In alternative embodiments, a client quality of service model can be introduced where each client may only access a fraction of the set of database servers 106. For example, a set of database servers 106 within the cluster may be reserved for real-time access by clients, while a different set of servers may be used for report generation clients to avoid impacting the real-time performance of the first set of clients. This quality of service model would only apply to read transactions to ensure the consistency of the database 114. In any implementation, including this quality of service model, all write operations would still need to be processed by all associated database servers 106 as described below.

The load balancer 118 maintains connections 120 to the multiple database servers 106, where each database engine 108 is used to store identical data records upon the respective DSFs 110. A connection 120 is opened between each database server 106 and the load balancer 118. The load balancer 118 may have any number of connections 120 established between it and the respective database servers 106. In one example, the load balancer 118 may operate in accordance with the examples described in U.S. Pat. No. 8,209,696, the entirety of which is incorporated by reference herein. The primary function of the load balancer 118 is to keep all copies of database data in the DSFs 110 up to date and correct by distributing any database activities that change data to all copies, performing recovery of those database servers 106 that temporarily go offline, while ensuring that any client 102 and transaction requests 117 that read data a given correct results based on standard database integrity rules.

The load balancer 118 maintains data consistency and integrity in the underlying data of the DSFs 110 through the use of distributed locking. One example of such locking is as follows: if a client 102 performs a write to a database table stored in one of the DSFs 110, the load balancer 118 maintains a virtual lock on that database table on each database server 106 to prevent other clients 102 from issuing conflicting writes from occurring out-of-order and to ensure that other clients 102 that attempt to read that data do not get sent to a database server 106 that has not yet completed the write. The locking is performed through virtual serialization entities that exist in the load balancer 118 expressly for the purposes of maintaining proper read and write ordering against conflicting elements within the data stored in the DSFs 110.

Figure 2:
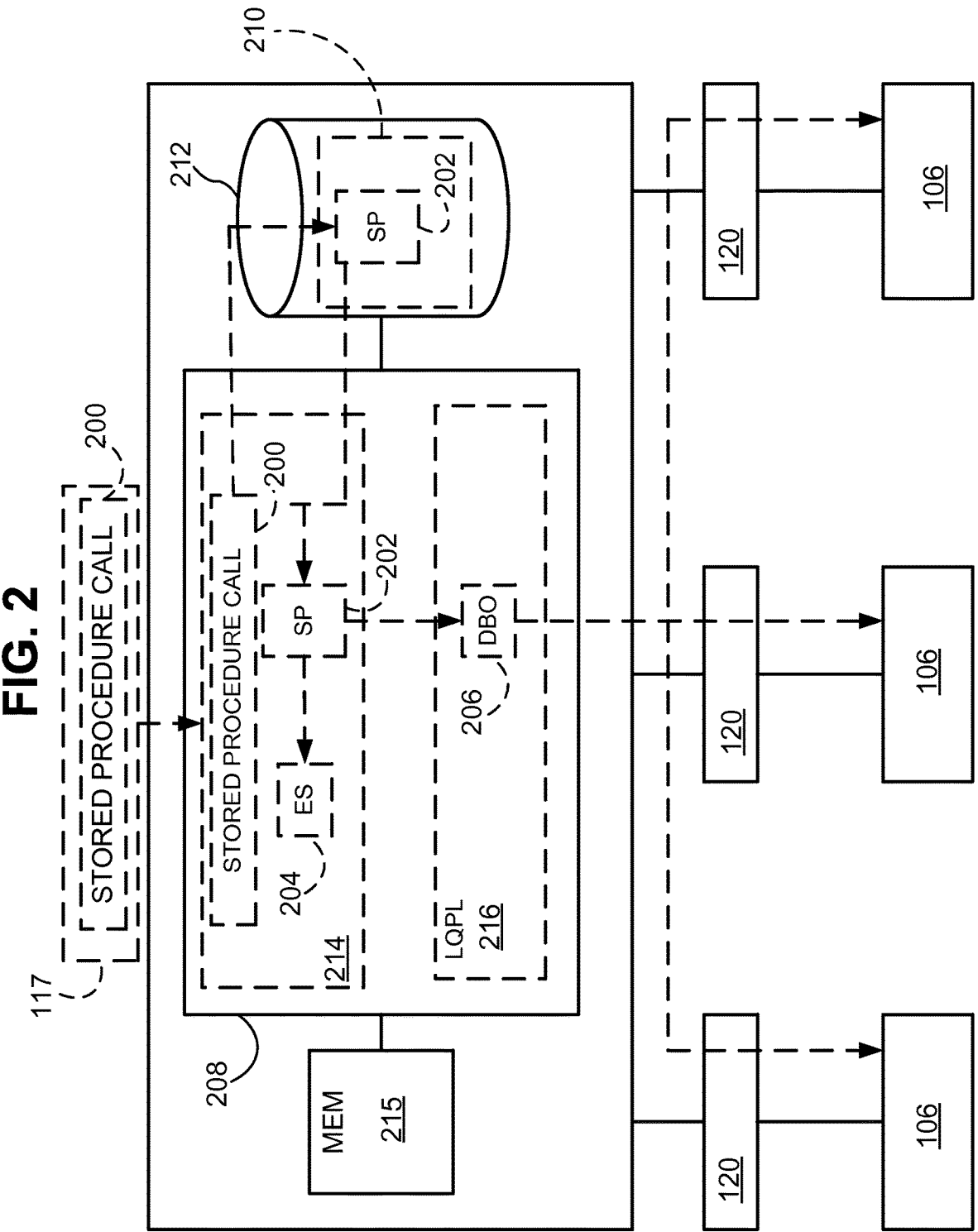
FIG. 2 is a block diagram of a portion of the distributed database system of FIG. 1.

In FIG. 2, a transaction request 117 may include a call 200 to a stored procedure 202. In one example, a stored procedure may refer to a piece of data processing logic that exists within the confines of the database server 106 and/or engine database engine 108. The stored procedure, may, for example, take on two forms: a binary stored procedure, where the logic is compiled into either native machine code (from languages like C or C++) or into a virtual machine code (from languages like Java or C#) and a scripted stored procedure, where the logic is expressed in plain text in a language recognized by the database engine 108. In one example, the procedural logic may be broken down into two major types; query statements/database operations that execute against the database itself and either update or retrieve data and execution statements, that may contain conditional-based statements such as input/output and temporary variable declarations, arithmetic operators, flow control statements like if/else and loop statements like for, while and do.

In one example, the load balancer 118 may identify operations of the stored procedure 202 that may be executed directly by the load balancer 118, execution statements (ES) 204, and may identify database operations (DBOs) 206 that may be executed at one or more of the database servers 106. In one example, the load balancer 118 may process the stored procedure 202 to identify execution statements 204 and DBOs 206, which may include standard query language (SQL) statements or any other suitable database language used in the distributed database system 114. The execution statements 204 may represent operations in the stored procedure 202 capable of being executed at the load balancer 118, which do not deal directly with the database data stored in the DSFs 110. In such a scenario, the load balancer 118 may selectively lock data, such as database tables, based on the execution of the stored procedure 202 allowing that less data to be required for locking during than if locking decisions were based on all possible outcomes as defined by the stored procedure 200.

Upon receipt of the stored procedure call 200 by at least one processor 208 of the load balancer 118, the load balancer 118 may recognize the stored procedure 202 from the call 200. The stored procedure 202 may be stored in a data dictionary 210 stored in a storage device 212 associated with the load balancer 118. Processor(s) 208 may represent physical processors and/or virtual processors. For non-compiled stored procedures (e.g. SQL defined), a standard SQL lexer/grammar/parser may be implemented in the load balancer 118 to perform the separation and generate an execution representation where the associated DBO 206 are sent through standard load balancer query processing logic to the to the database servers 106 to access and/or modify the underlying data.

In one example, the load balancer 118 may recognize the compiled stored procedure 200 through an analysis module 214. As described herein, each module may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of memory 215, for example, that comprises instructions executable with the processor 208 or other processor to implement one or more of the features of the module. When any one of the modules includes the portion of the memory that comprises instructions executable with the processor, the module may or may not include the processor. In some examples, each module may just be the portion of the memory 215 or other physical memory that comprises instructions executable with the processor 208 or other processor to implement the features of the corresponding module without the module including any other hardware. Because each module includes at least some hardware even when the included hardware comprises software, each module may be interchangeably referred to as a hardware module, such as the analysis hardware module. The memory 215 may represent and may be computer-readable storage media or memories, such as a cache, buffer, RAM, removable media, hard drive, flash drive or other computer-readable storage media. Computer-readable storage media may include various types of volatile and nonvolatile storage media.

Based on the recognition by the analysis module 214, the load balancer 118 may execute the compiled stored procedure 202 if it is already in native machine code or utilize an appropriate virtual machine if it is in bytecode/virtual object code, which may include use of the memory 213. In this case, the compiled stored procedure 202 will issue SQL statements as DBOs 206 through a load balancer query processing logic (LQPL) module 216.

Regardless of the origin of the DBOs 206, the resultant queries are treated by the LQPL module 216 of the load balancer 118 like any other transaction request 117 issued from the client. This includes any associated locking, recovery logging and routing and other associated actions such as those disclosed in U.S. Pat. No. 8,209,696. The load balancer 118 may send the DBOs 206 to one or more of the database servers 106 selected for execution, depending on the particular action of the DBO 206. For example, if a DBO 206 is a write operation, the DBO 206 may be replicated by the load balancer 118 via the LQPL module 216 and sent to each database server 106 associated with a copy of data to be manipulated in a respective DSF 110. Such an example is shown in FIG. 2, with the DBO 206 being issued to each database server 106 by the load balancer 118. In read-related DBOs 206, selection of a particular database server 106 may be based on predetermined selection schemes that determine the particular database servers 106 to receive the DBOs 206.

Separation of the execution statements 204 and the DBOs 206 allows the load balancer 118 to selectively lock database tables (or other data structures) based on the actual DBO 206 being executed instead of locking more than needed due to the entirety of the stored procedure 202 being executed at a single database server 106. Without actual execution of the execution statements 204, the load balancer 118 would be required to lock all database tables referenced in the stored procedure 202 in order to ensure data integrity. However, in such a scenario, any database-table locking requires that the locked tables be inaccessible by other queries while the stored procedure 200 is being executed at a database server 106, even if the result is that some of the database tables are not even accessed in this particular execution of the stored procedure 200 due to various conditional statements. Allowing the load balancer 118 to execute the execution statements 204 allows selective database-table locking dependent upon execution of the execution statements 204. Furthermore, it allows the load balancer 118 to forgo sending DBOs 206 to the database servers 106 if certain conditions are present based on execution of the execution statements 204. Thus, as illustrated in FIG. 2, the execution statements 204 remain at the load balancer 118 to be executed by the processor 206, while DBOs 206 are sent to a database server 106 to be executed. DBO statements 202 pass through the LQPL module 216 and any modifications performed by execution of the stored procedure 202 are replicated to all associated database tables or other relevant data structures in the DSFs 110 because the LQPL module 216 will have sent the underlying DBO statements of the DBOs 206 to each of the replicas stored across the DSFs 110. Likewise, DBO read performance within the stored procedure 202 is enhanced, because the load balancer 118 can distribute and balance the read-based DBOs 206 across the database replicas. While the examples described herein are in the context of table-level processing, a stored procedure referencing a database record of any granularity, such as a row, for example, may be handled by the load balancer 118 and the database servers 106.

An example of such operation by the load balancer 122 may receive a stored procedure 202 designated as "test," represented by the following pseudocode:

begin transaction
if (val<0) then
insert into T1 values (−val)
else
insert into T2 values (val);
endif
commit
insert into T3 values (val);

where T1, T2, and T3 are all tables stored in each of the DSFs 110. The function "test" receives an integer as an argument "val". If the integer is less than zero, the value is negated, which transforms the argument to a positive number and is placed into table "T1." If the value is zero or greater (positive integer), the value "val" is placed into table "T2". Once the transaction is committed, the value "val" is placed into table "T3".

As indicated in the pseudocode for "test," conditional statements exist, and thus, until the input argument is evaluated if run directly in the database servers 106, tables "T1," "T2," and "T3" would need to be locked by the load balancer 118, since all are referenced in "test," which would be entirely executed at a database server 106 without visibility to the internal functionality. Executing the execution statements 204 at the load balancer 118 may allow fewer tables to be locked during execution of the stored procedure 202.

For example, in the stored procedure "test", the execution statements 204 may include the if-then-else statements. In such a scenario, the load balancer 118 may execute the if-then-else segment to determine which table may is to be used. For example, the load balancer 118 may evaluate the if-then-else. If the value "val" is less than zero, the load balancer 118 recognizes that the table T1 is to be locked and if the value "val" is not less than zero, table T2 is to be locked. Thus, by executing the execution statements 204 at the load balancer 118, only one of the tables T1 or T2 needs to be locked instead of both tables T1 and T2. Once the value "val" is determined, the load balancer 118 may send the qualifying DBOs 206 to the selected database server 106 selected to execute the DBOs 206. In this example, both statements are writes so they are sent to all database servers 106. The load balancer 118 may also be responsible for sending the correct argument. For example, in sending the operation "insert into T1 values (−val)" to the selected database server T1, the load balancer 118 may determine the value of "−val" to be sent with the corresponding database operation 204. The "commit" operation is sent to all the database servers 106, due to being a write operation, and the commit logic may be performed. Upon completion of the stored procedure 202, the load balancer 118 may release the virtual locking of database tables.

Figure 3:
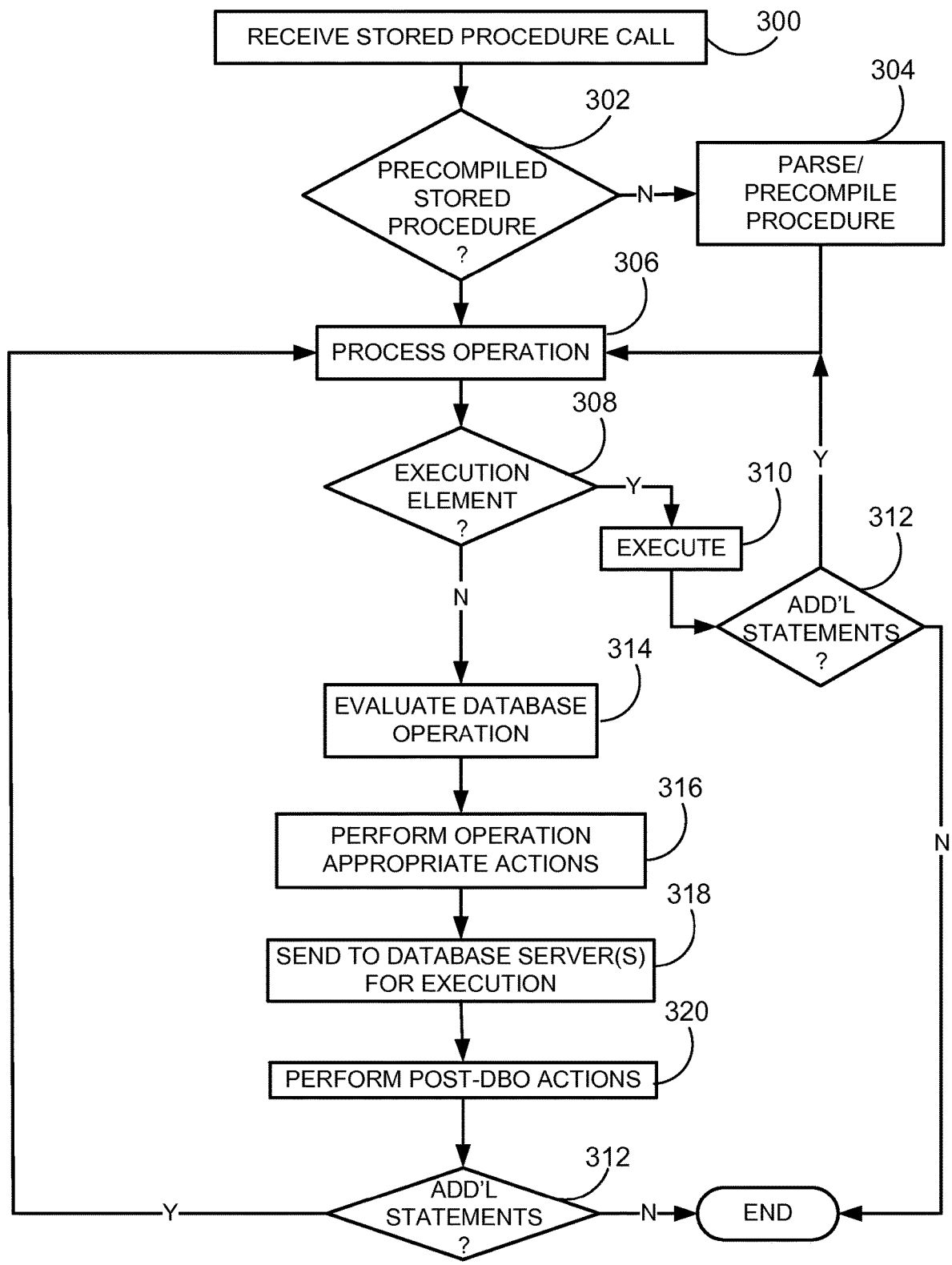
FIG. 3 is an operational flow diagram of example operation of a load balancer.

FIG. 3 is an operational flow diagram of example operation of the load balancer 118. Operations performed by the load balancer 118 may be carried out by one or more processors 208 of the load balancer 118. In one example, the load balancer 118 may receive a call 200 to a stored procedure 202 (300). The load balancer 118 may determine if the stored procedure 202 is precompiled by checking the data dictionary 208 (302). A precompiled stored procedure may be stored in the data dictionary 210 as a "name/details" record and the distributed/provided binary code (which may be stored outside the data dictionary 208). In one example, execution of the stored procedure 202, may involve dynamically loading the binary into a process address space of the memory 213 and execute it natively. In such a scenario, any DBOs 206 performed by the procedure may be performed through a very specific function call defined by the database code to allow it.

If the stored procedure 200 is not precompiled, the stored procedure 202 may be stored in the dictionary as the "name/details" record and the scripted text itself. On startup or when the stored procedure is called the first time, the script/text may be drawn from the data dictionary and may be precompiled/parsed (304) it into an internal form that may execute relatively faster. One the stored procedure 202 is in form for execution, the load balancer 118 may process a statement in the stored procedure 202 (306). The load balancer 118 may determine if the statement is an execution statement 204 (308). If so, the execution statement 204 may be executed at the database load balancer 118 (310). In examples in which the stored procedure 202 is precompiled, the executed execution statements would take the form of 'native' data processing instructions as recognized by the processor 208. Execution of the execution statements 204 may cause other statements, such as other execution statements 204 and DBOs 206 to be bypassed due to the results of the execution.

Upon execution, the database load balancer 118 may determine if additional statements exist in the stored procedure 202 (312). If no additional statements exist, execution of the stored procedure 202 may end. If additional statements do exist in the stored procedure 202, the database load balancer 118 may process the next statement (306). If the statement is an execution statement 204, it may be executed in the manner described. If not, the statement is a DBO 206 and the database load balancer 118 may evaluate the DBO 206 (314), such as through the LQPL module 216. Upon determination of the context of the DBO 206, such as read- or write-based, for example, the database load balancer 118 may perform DBO-appropriate actions such as internally locking tables for write actions, etc. (316). Upon performance of the DBO-appropriate actions, the database load balancer 118 may send the DBOs 206 to one or more database servers 106 depending on the particular DBO 206 (318) as previously described. Once completed, the database load balancer 118 may perform any post-DBO actions (320), such as releasing virtual locks for example. If additional statements in the stored procedure 202 exist (312), the database load balancer 118 may process the next statement (306) accordingly. If no additional statements exist, execution of the stored procedure may end.

While various embodiments of the invention have been described, it will be apparent to those of ordinary skill in the art that many more embodiments and implementations are possible within the scope of the invention. While the examples provided deal with a database system, the load balancer may execute stored procedures dealing with any type of data structures or data stores, such as file systems, for example. Accordingly, the invention is not to be restricted except in light of the attached claims and their equivalents.

I claim:

1. A method comprising:
   receiving, with a processor, a stored procedure associated with data stored in a plurality of data stores, wherein each of the plurality of data stores exclusively stores a respective copy of the data, wherein the stored procedure comprises a plurality of executable statements configured to be executed on a portion of the data, and wherein the processor is configured to distribute the plurality of executable statements to at least one of a plurality of other processors, wherein none of the plurality of other processors are directly linked to one another;
   identifying, with the processor, a first executable statement of the plurality of executable statements to be executed by the processor and a second executable statement of the plurality of executable statements that is executable by at least one of the plurality of other processors, wherein each of the other processors have exclusive access to a respective one of the copies of the data; and
   executing, with the processor, the first executable statement, wherein execution of the first executable statement results in at least one of other executable statements of the plurality of executable statements being applied to less than the portion of the data and elimination of at least one of the other executable statements from execution.

2. The method of claim 1, further comprising:
   determining, with the other processor, that the second executable statement is to be transmitted to the at least one of the plurality of other processors to be executed in response to execution of the first executable statement; and
   transmitting, with the processor, the second executable statement to the at least one other processor to be executed.

3. The method of claim 2, wherein the second statement is a write operation associated with a portion of the data, and wherein the method further comprises denying, with the processor, access to each copy of the portion of the data while the second statement is being executed.

4. The method of claim 2, further comprising:
   identifying, with the processor, a third executable statement of the plurality of executable statements that is executable by the at least one of a plurality of other processors; and
   determining, with the processor, to forgo transmission of the third executable statement to the at least one of a plurality of other processors in response to execution of the first executable statement.

5. The method of claim 1, further comprising:
   identifying, with the processor, a third executable statement and a fourth executable statement of the plurality of executable statements that are executable by at least one of a plurality of other processors; and
   selecting, with the processor, only one of the third executable statement and the fourth executable statement based on a result from execution of the first executable statement.

6. The method of claim 1, wherein the second executable statement is one of a read operation or a write operation.

7. The method of claim 1, wherein the stored procedure is one of binary stored procedure and a scripted stored procedure.

8. A system comprising:
- a plurality of data store systems, wherein each data store system comprises at least one respective processor and a respective storage device, wherein each respective storage device has an exclusive copy of organized data, and wherein none of the data store systems are directly linked with one another;
- a load balancer processor in communication with plurality of data store systems, wherein the load balancer processor is configured to:
- receive a stored procedure associated with a portion of the organized data stored in each of the respective storage devices, wherein the stored procedure comprises a plurality of executable statements;
- identify a first executable statement of the plurality of executable statements to be executed by the load balancer processor and a second executable statement of the plurality of executable statements that is executable by at least one the respective processors of the plurality of data store systems; and
- execute the first executable statement, wherein execution of the first executable statement results in at least one of other executable statements of the plurality of executable statements being applied to less than the portion of the organized data and elimination of at least one of the other executable statements from execution.

9. The system of claim 8, wherein the load balancer is further configured to:
- determine that the second executable statement is to be transmitted to the at least one the respective processors of the plurality of data store systems to be executed in response to execution of the first executable statement; and
- transmitting, with the processor, the second executable statement to least one the respective processors of the plurality of data store systems to be executed.

10. The system of claim 9, wherein the second statements a write operation associated with a portion of the organized data, and wherein the load balancer processor is further configured to deny access to each copy of the organized data while the second statement is being executed.

11. The system of claim 9, wherein the load balancer processor is further configured to:
- identify a third executable statement of the plurality of executable statements that is executable by the at least one the respective processors of the plurality of data store systems; and
- determine to forgo transmission of the third executable statement to the at least one the respective processors of the plurality of data store systems in response to execution of the first executable statement.

12. The system of claim 8, wherein the load balancer processor is further configured to:
- identify a third executable statement and a fourth executable statement of the plurality of executable statements that are executable the at least one the respective processors of the plurality of data store systems; and
- selecting, with the processor, only one of the third executable statement and the fourth executable statement based on a result from execution of the first executable statement.

13. The system of claim 8, wherein the second executable statement is one of a read operation or a write operation.

14. The system of claim 8, wherein the stored procedure is one of binary stored procedure and a scripted stored procedure.

15. A non-transitory computer-readable medium encoded with a plurality of instructions executable by a processor, the plurality of instructions comprising:
- instructions to receive a stored procedure associated with data stored in a plurality of data stores, wherein each of the plurality of data stores exclusively stores a respective copy of the data; wherein the stored procedure comprises a plurality of executable statements configured to be executed on a portion of the data;
- instructions to identify a first executable statement of the plurality of executable statements to be executed by the processor and a second executable statement of the plurality of executable statements that is executable by at least one of a plurality of other processors, wherein none of the other processors are directly linked to one another, wherein each of the other processors have access to a respective one of the copies of the data; and
- instructions to execute the first executable statement, wherein execution of the first executable statement results in at least one of other executable statements of the plurality of executable statements being applied to less than the portion of the data and elimination of at least one of the other executable statements from execution.

16. The non-transitory computer-readable medium of claim 15, wherein the plurality of instructions further comprises:
- instructions to determine that the second executable statement is to be transmitted to the at least one of the plurality of other processors to be executed in response to execution of the first executable statement; and
- instructions to transmit the second executable statement to the at least one other processor to be executed.

17. The non-transitory computer-readable medium of claim 16, wherein the second statement is a write operation associated with a portion of the data; and wherein the plurality of instructions further comprises instructions to deny access to each copy of the portion of the data while the second statement is being executed.

18. The non-transitory computer-readable medium of claim 16, wherein the plurality of instructions further comprises instructions to identify a third executable statement of the plurality of executable statements that is executable by the at least one of a plurality of other processors; and
- instructions to forgo transmission of the third executable statement to the at least one of a plurality of other processors in response to execution of the first executable statement.

19. The non-transitory computer-readable medium of claim 15, wherein the plurality of instructions further comprises:
- instructions to identify a third executable statement and a fourth executable statement of the plurality of executable statements that are executable by at least one of a plurality of other processors; and
- instructions to select only one of the third executable statement and the fourth executable statement based on a result from execution of the first executable statement.

20. The non-transitory computer-readable medium of claim 15, wherein the stored procedure is one of binary stored procedure and a scripted stored procedure.

* * * * *